(12) United States Patent
Okazaki

(10) Patent No.: US 6,449,085 B1
(45) Date of Patent: Sep. 10, 2002

(54) OPTICAL DIRECT AMPLIFIER AND CONTROL METHOD THEREOF

(75) Inventor: Hideya Okazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/208,412

(22) Filed: Dec. 10, 1998

(30) Foreign Application Priority Data

Dec. 10, 1997 (JP) .............................. 9-339551

(51) Int. Cl.[7] .................................................. H01S 3/00
(52) U.S. Cl. ................................................. 359/337.12
(58) Field of Search ............................ 359/341.1, 337, 359/337.12, 341.43

(56) References Cited

U.S. PATENT DOCUMENTS

| | | | | |
|---|---|---|---|---|
| 5,680,247 A | | 10/1997 | Hideki ........................ 359/341 |
| 5,699,081 A | | 12/1997 | Myron et al. ................ 359/341 |
| 5,764,404 A | * | 6/1998 | Yamane et al. ............. 359/341 |
| 5,828,486 A | * | 10/1998 | Yoshida ....................... 359/341 |
| 5,861,980 A | * | 1/1999 | Ono ............................ 359/341 |
| 5,966,236 A | * | 10/1999 | Okuno ........................ 359/337 |
| 5,995,276 A | * | 11/1999 | Tajima et al. ............... 359/341 |
| 6,055,093 A | * | 4/2000 | Chickuma et al. .......... 359/337 |
| 6,163,399 A | * | 12/2000 | Berg ........................... 359/341 |
| 6,233,078 B1 | * | 5/2001 | Harano et al. .............. 359/134 |

FOREIGN PATENT DOCUMENTS

| | | | |
|---|---|---|---|
| EP | 0 762 569 | 3/1997 | ............ H01S/3/06 |
| FR | 5 699 081 | 10/1997 | ............ H01S/3/09 |
| GB | 2 294 170 | 4/1996 | ............ H04B/10/17 |
| JP | 6-21897 | 1/1994 | ............ H04B/10/16 |
| JP | 6-104868 | 4/1994 | ............ H04B/9/00 |
| JP | 6-338874 | 12/1994 | ............ H04B/10/00 |
| JP | 8-95097 | 4/1996 | ............ H04B/9/00 |
| JP | 9-219680 | 8/1997 | ............ H04B/9/00 |
| JP | 9-219696 | 8/1997 | ............ H04B/9/00 |
| JP | 9-289503 | 11/1997 | ............ H04B/9/00 |
| JP | 10-22979 | 1/1998 | ............ H04B/9/00 |
| JP | 10-51396 | 2/1998 | ............ H04B/9/00 |
| JP | 10-229386 | 8/1998 | ............ H04B/9/00 |
| JP | 10-242939 | 9/1998 | ............ H04B/9/00 |

* cited by examiner

*Primary Examiner*—Thomas H. Tarcza
*Assistant Examiner*—Deandra M. Hughes
(74) *Attorney, Agent, or Firm*—Sughrue Mion, PLLC (57) ABSTRACT

An optical direct amplifier includes an O/E converter for converting a branched output light into an electric signal, a frequency variable filter for detecting a modulated frequency specific to a signal light from the electric signal, a counter for counting the number of modulated frequencies detected, and a control circuit. When the count value (number of signal lights) output from the counter changes, the control circuit controls the output of the optical direct amplifier such that the optical output level per signal light can be equal to the optical output level per signal light indicated before the count value (number of signal lights) changes.

14 Claims, 8 Drawing Sheets

FIG.6A OUTPUT OF FREQUENCY VARIABLE FILTER

FIG.6B OPERATION OF COUNT CIRCUIT

OPTICAL DIRECT AMPLIFIER AND CONTROL METHOD THEREOF

BACKGROUND OF THE INVENTION

The present invention relates to an optical direct amplifier and the control method thereof, and more specifically to an optical direct amplifier for amplifying a wavelength multiplexed signal light and a method for controlling its output level.

In the conventional optical wavelength multiplexed transmission system, an optical fiber transmission line and an optical direct amplifier are alternately connected and mounted between an optical transmission unit for transmitting a wavelength multiplexed signal light and an optical reception unit. The optical direct amplifier includes a rare-earth added fiber, an optical coupler, an optical isolator, an optical splitter, an excitation laser, an excitation laser control circuit, an O/E (opto-electric) converter, etc. One end of the rare-earth added fiber is connected to an input unit of the optical direct amplifier, and the other is connected to the optical coupler. An optical isolator 3 is connected to the optical coupler, and the optical splitter is connected to the output unit of the optical isolator. One output unit of the optical splitter is the output unit of the optical direct amplifier, and the other output unit is connected to the O/E converter. The excitation laser control circuit is connected to the O/E converter, and the excitation laser is connected to the excitation laser control circuit. As described in Japanese Patent Application Laid-Open No. 6-338874, etc., the excitation laser control circuit controls the output of the excitation laser such that the output level of the optical direct amplifier can be constant based on the signal converted into an electric signal by the O/E converter.

When the optical transmission unit transmits a wavelength multiplexed signal light having, for example, four wavelengths (hereinafter referred to as 4 channels) in the conventional optical wavelength multiplexed transmission system, the output level is controlled to be constant (for example, +8 dBm/4 channels based on +2 dBm/1 channel). However, even if two channels of the four channels are interrupted for any reason, the excitation laser control circuit controls the output level of the optical direct amplifier to be totally +8 dBm. Therefore, the optical output level per channel is controlled to be +5 dBm, which is higher than in a normal operation (4 channels). At this time, the transmission is disabled by the nonlinear effect of the optical fiber transmission line. On the other hand, when a signal light is increased in number, the optical output level per channel is lower than in the normal operation (4 channels).

SUMMARY OF THE INVENTION

The present invention aims at optically controlling the output level of an optical direct amplifier even when the number of signal lights is decreased by a fault, etc. or when the number of the signal lights is increased on the transmitting side.

The optical direct amplifier of the present invention includes a detector for detecting the number of modulated frequencies specific to an output signal light; and a control circuit for controlling the output of the optical direct amplifier depending on the number of modulated frequencies detected by the detector. The detector includes an opto-electric converter for converting an output wavelength multiplexed signal light into an electric signal; a frequency detector for detecting a modulated frequency specific to each signal light from the electric signals converted by the opto-electric converter; and a counter for counting the number of modulated frequencies. When the number of modulated frequencies specific to the signal light detected by the detector has changed, the control circuit controls the optical output level of one signal light such that the optical output level can be the same as that before the number has changed. The method of controlling the optical direct amplifier according to the present invention includes the steps of counting the number of modulated frequencies specific to the wavelength multiplexed signal light, and controlling, if the number has changed, the optical output level per signal light to be the same as the optical output level per signal light obtained before the number has changed. The optical wave length multiplexed transmission system includes an optical transmission unit, an optical reception unit, optical fiber transmission lines, and an optical direct amplifier provided between the optical fiber transmission lines. The optical direct amplifier includes a detector for detecting the number of modulated frequencies specific to an output signal light; and a control circuit for controlling the output of the optical direct amplifier depending on the number of modulated frequencies detected by the detector.

The above described optical direct amplifier maintains an initialization value as the output level per channel even if the number of signal lights increases or decreases.

BRIEF DESCRIPTION OF THE DRAWINGS

The above and other objects, features and advantages of the present invention will become apparent from the following detailed description when taken with the accompanying drawing in which.

DETAILED DESCRIPTION OF THE PREFERRED EMBODIMENTS

Figure 1:
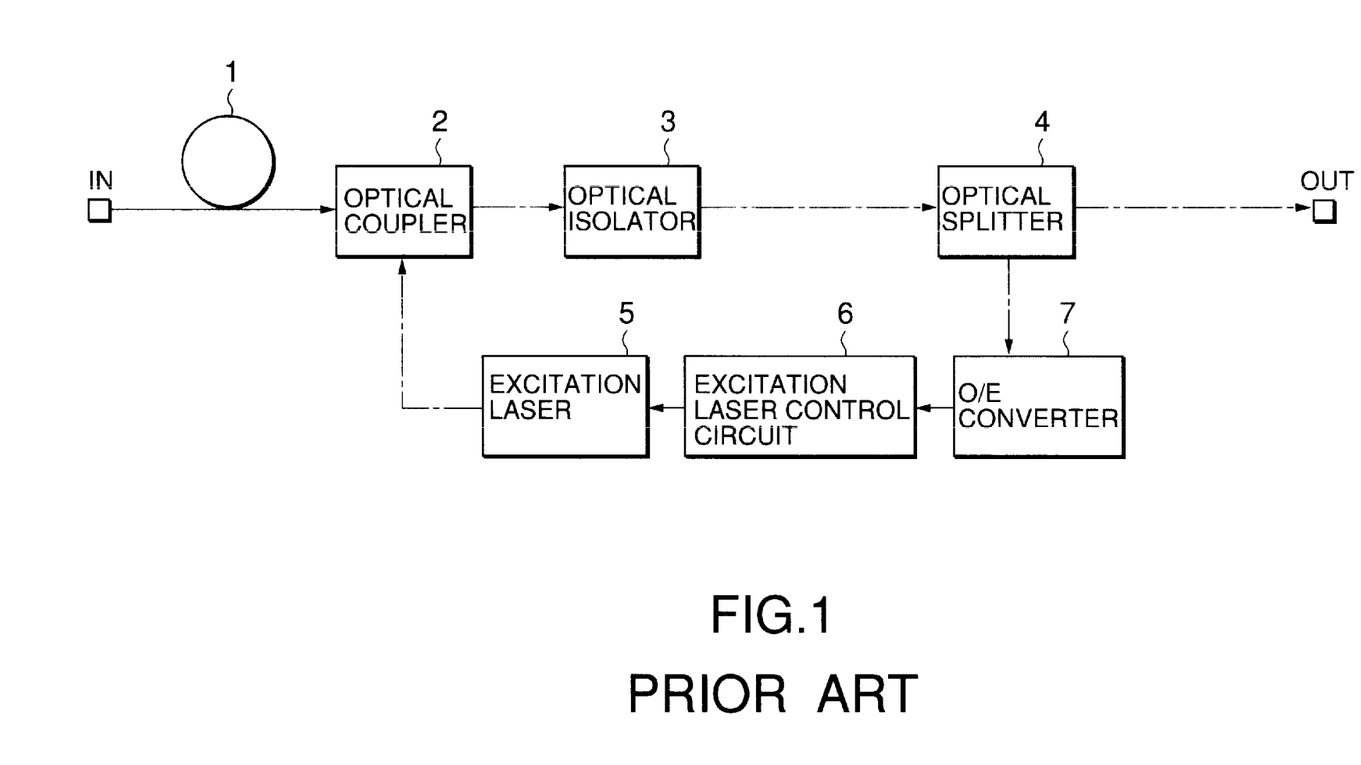
FIG. 1 is a block diagram showing the conventional optical direct amplifier.
Figure 2A:
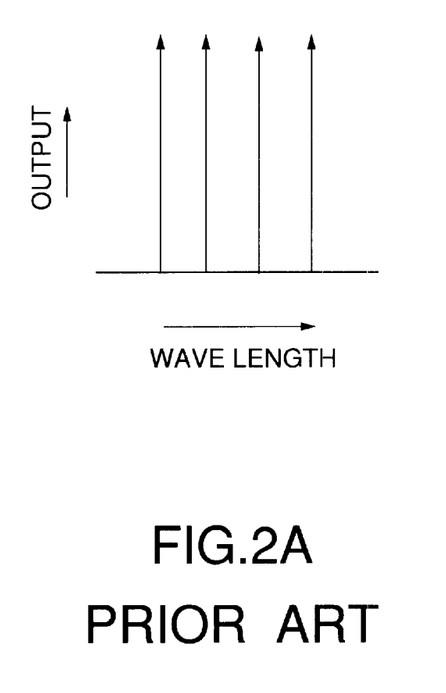
FIGS. 2A and 2B show the spectra of the output of 4 channels and 2 channels of the conventional optical direct amplifier.
Figure 2B:
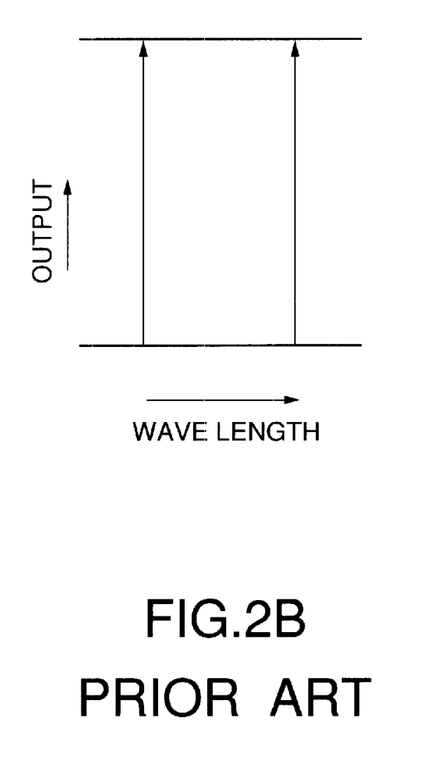

In the conventional optical direct amplifier shown in FIG. 1, one end of a rare-earth added fiber 1 is connected to an input unit of the optical direct amplifier, and the other end is connected to an optical coupler 2. An optical isolator 3 which passes a signal in one direction only is connected to the optical coupler 2. An optical splitter 4 is connected to an output unit of the optical isolator 3. One of the output unit of the optical splitter 4 is the output unit of the optical direct amplifier, and the other output unit is connected to an O/E converter 7. An excitation laser control circuit 6 is connected to the output unit of the O/E converter 7. An excitation laser 5 is connected to the excitation laser control circuit 6. The excitation laser control circuit 6 controls the output of the excitation laser 5 such that the output level of the optical direct amplifier can be constant based on the signal converted into an electric signal by the O/E converter 7. In the above described optical direct amplifier, as shown in FIGS. 2A and 2B, if two channels of the four the occurrence of a fault, channels are reduced due to the optical output level per channel becomes higher than in a normal operation. Therefore, the non-linear effect of the transmission line fiber disables the optical transmission.

Figure 3:
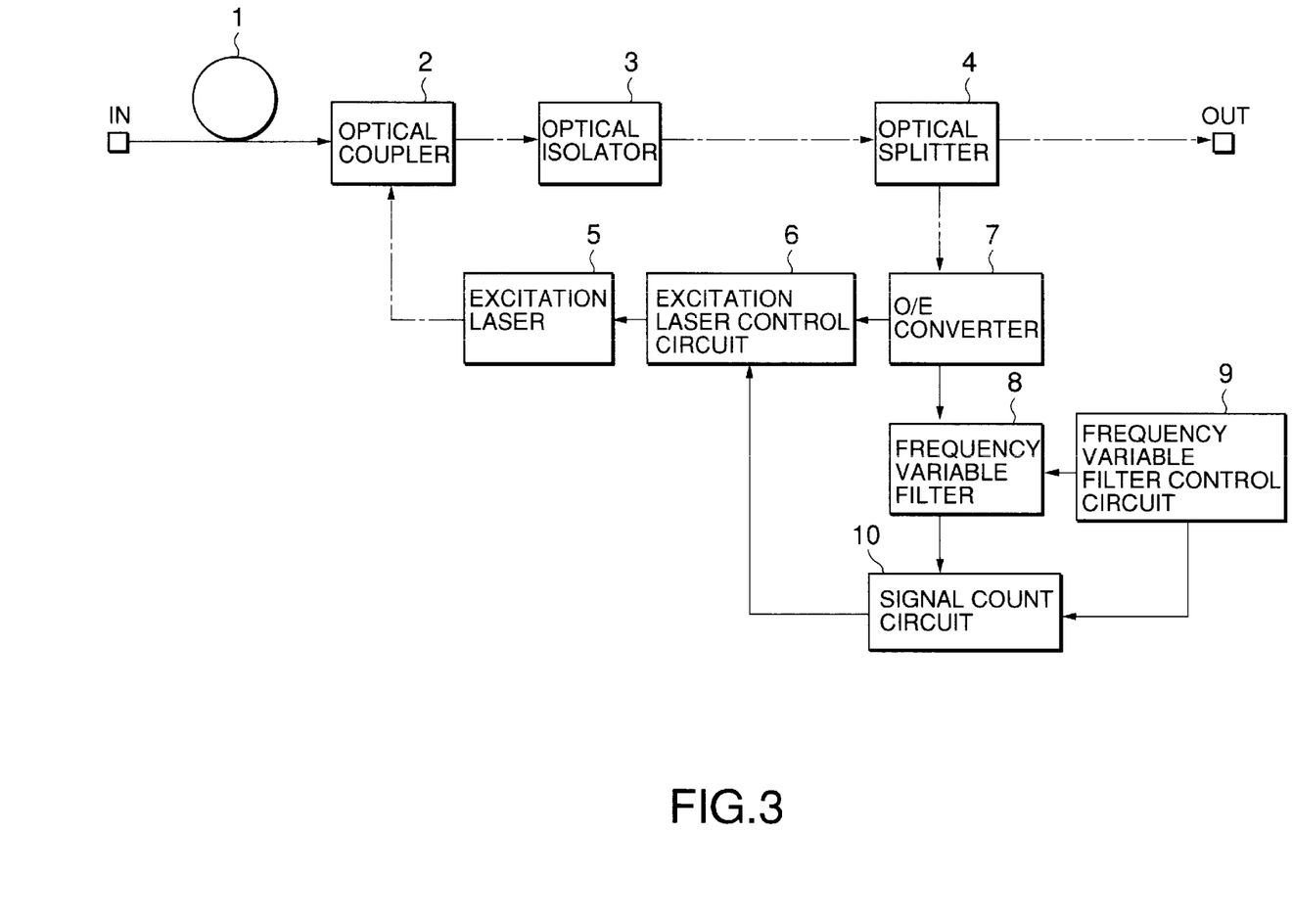
FIG. 3 is a block diagram showing the optical direct amplifier according to the present invention.

FIG. 3 shows an example of the optical direct amplifier according to the present invention. The optical direct amplifier comprises an erbium doped fiber 1, the optical coupler 2, the optical isolator 3, the optical splitter 4, the excitation laser 5, the excitation laser control circuit 6, and the O/E (opto-electric) converter 7. The portion including these components is the same as the conventional structure shown in FIG. 1. The optical direct amplifier according to the present invention further comprises a frequency variable filter 8, a frequency variable filter control circuit 9, and a signal count circuit 10. The output from the O/E (optoelectric) converter 7 is input to the frequency variable filter 8, and the output of the frequency variable filter 8 is input to the signal count circuit 10. The frequency variable filter control circuit 9 is connected to the frequency variable filter 8 and the signal count circuit 10, and controls these units. The output (count value) of the signal count circuit 10 is input to the excitation laser control circuit 6. The excitation laser control circuit 6 controls the excitation laser 5 depending on the output of the signal count circuit 10.

Figure 4:
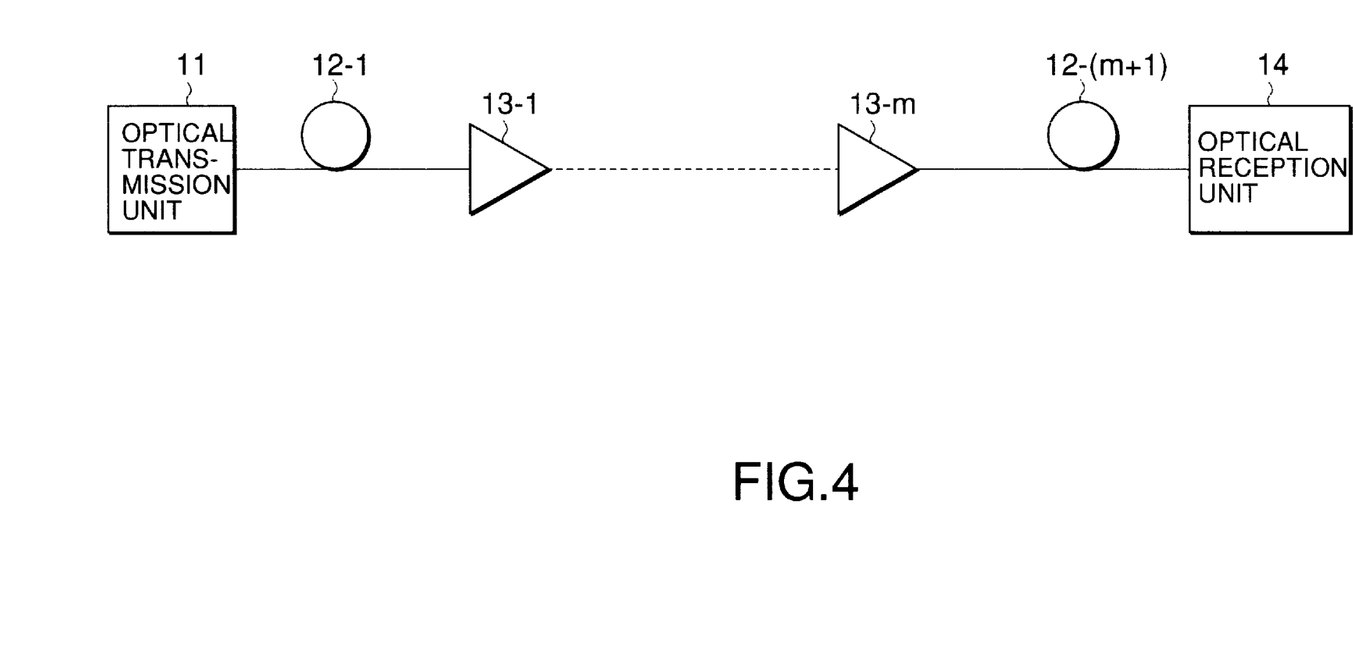
FIG. 4 is a block diagram showing the optical wavelength multiplexed transmission system.

As shown in FIG. 4, the optical wavelength multiplexed transmission system comprises an optical transmission unit 11, optical fiber transmission lines 12-1 through 12-(m+1), an optical direct amplifier 13-$i$ ($i$=1, . . . , m), and an optical reception unit 14. Each optical direct amplifier amplifies a wavelength multiplexed signal light which is propagated in an optical fiber transmission line to a predetermined level.

Figure 5:
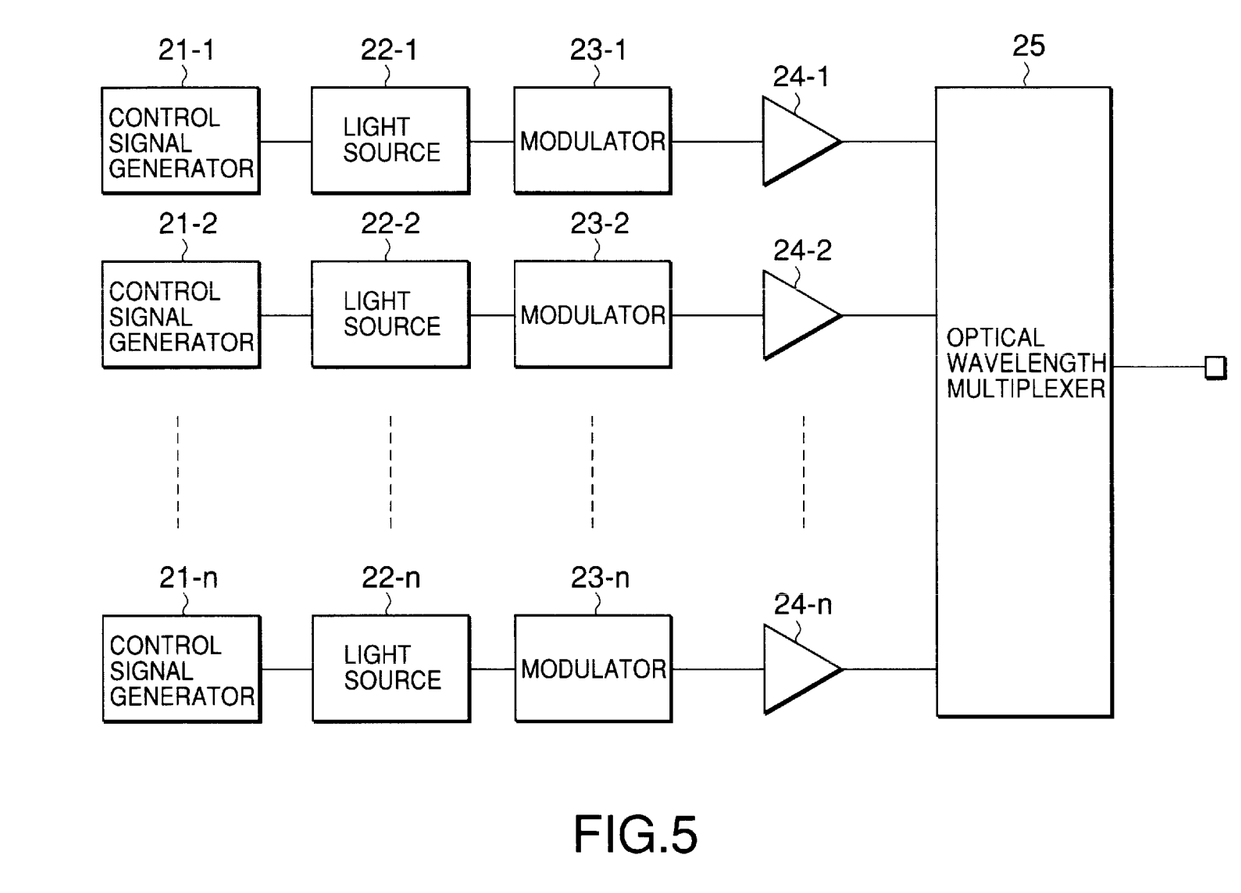
FIG. 5 is a block diagram of the optical transmission unit.

As shown in FIG. 5, the optical transmission unit 11 comprises control signal generators 21-1 through 21-n, light sources 22-1 through 22-n, modulators 23-1 through 23-n, optical direct amplifiers 24-1 through 24-n, and an optical wavelength multiplexer 25. Control signals having different frequencies f1 through fn are input from the control signal generators 21-1 through 21-n to the light sources 22-1 through 22-n having n different wavelengths. The optical output with the control signal is output from these light sources. The modulators 23-1 through 23-n for modulating the optical output are connected to the output units of the light sources 22-1 through 22-n respectively. These modulators 23-1 through 23-n put the data to be transmitted to the optical receiver onto the optical output from the light sources 22-1 through 22-n. For example, the wavelengths of the light sources are 1.3 micron band, 1.55 micron band, etc., and the modulated frequencies are MHz band through GHz band. The modulated frequency depends on the system in which the optical direct amplifier is used. The optical direct amplifiers 24-1 through 24-n are connected to the output units of the modulators 23-1 through 23-n. The optical wavelength multiplexer 25 is connected to the output units of the optical direct amplifiers 24-1 through 24-n. The n signal lights are changed into wavelength multiplexed signals in the optical wavelength multiplexer 25, and transmitted to the optical fiber transmission line 12-1.

Described below are the operations of the optical direct amplifier according to the present invention. The optical transmission unit 11 transmits a wavelength multiplexed signal light containing four signal lights modulated by the frequencies f1 through fn. When the optical wavelength multiplexed signal light is input to an optical direct amplifier 13-$i$, the optical wavelength multiplexed signal light is branched by the optical splitter 4, and then converted into an electric signal by the O/E converter 7.

Figure 6A:
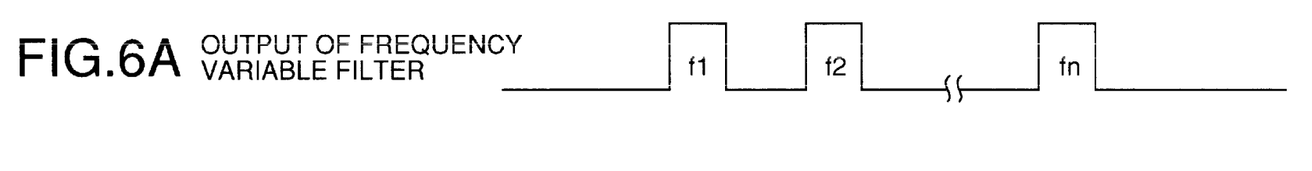
FIGS. 6A and 6B are timing charts showing the counting operations.
Figure 6B:
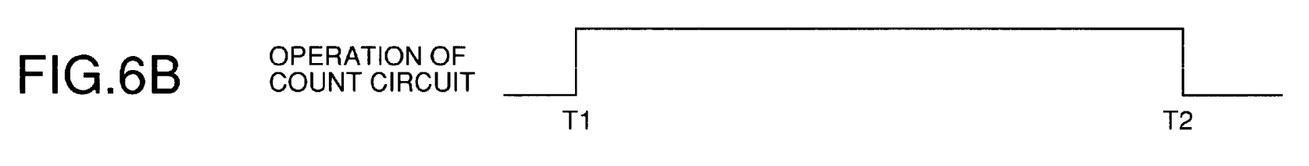
Figure 7A:
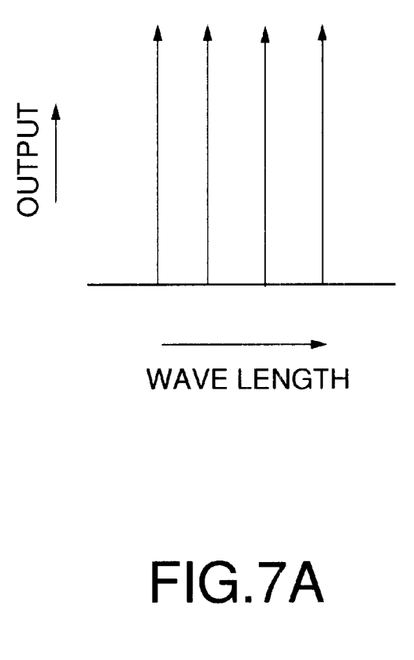
FIGS. 7A and 7B show the spectra of the output of the optical direct amplifier according to the present invention.
Figure 7B:
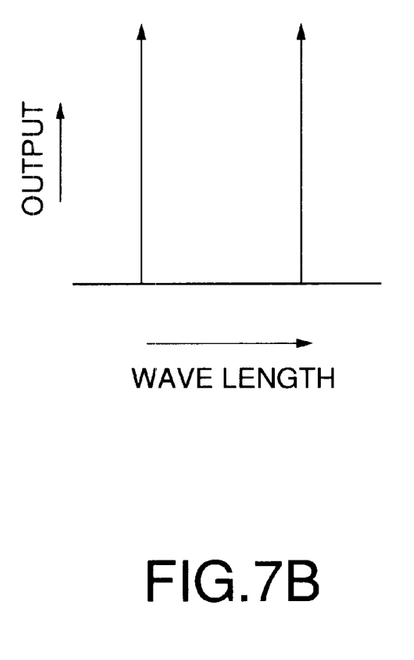

Using the control signal of the frequency variable filter control circuit 9, the frequency variable filter 8 sweeps the electric signal output from the O/E converter 7, and detects the frequencies f1 through fn (refer to FIGS. 6A and 6B). The modulated frequencies detected by the frequency variable filter 8 are counted for a predetermined time by the signal count circuit 10 operating in synchronization with the frequency variable filter control circuit 9. The signal count circuit 10 transmits the result to the excitation laser control circuit 6. The excitation laser control circuit 6 controls the excitation laser 5 depending on the counted number of signal lights such that the output level per channel of the optical direct amplifier can be the initialization value. If two of the four channels are interrupted for any reason, the number of modulated frequencies counted by the signal count circuit 10 is 2. Upon receipt of the signal count value, the excitation laser control circuit 6 controls the optical output level per channel to be +2 dBm/channel which is equal to the initialization value. Relating to the output of each channel, as shown in FIGS. 7A and 7B, the optical output level per channel of the optical direct amplifier at the initialization is substantially equal to the optical output level per channel at the time when a fault occurs in two channels. When the channels increase in number, the output level per channel of the optical direct amplifier can be similarly controlled as described above.

Figure 8:
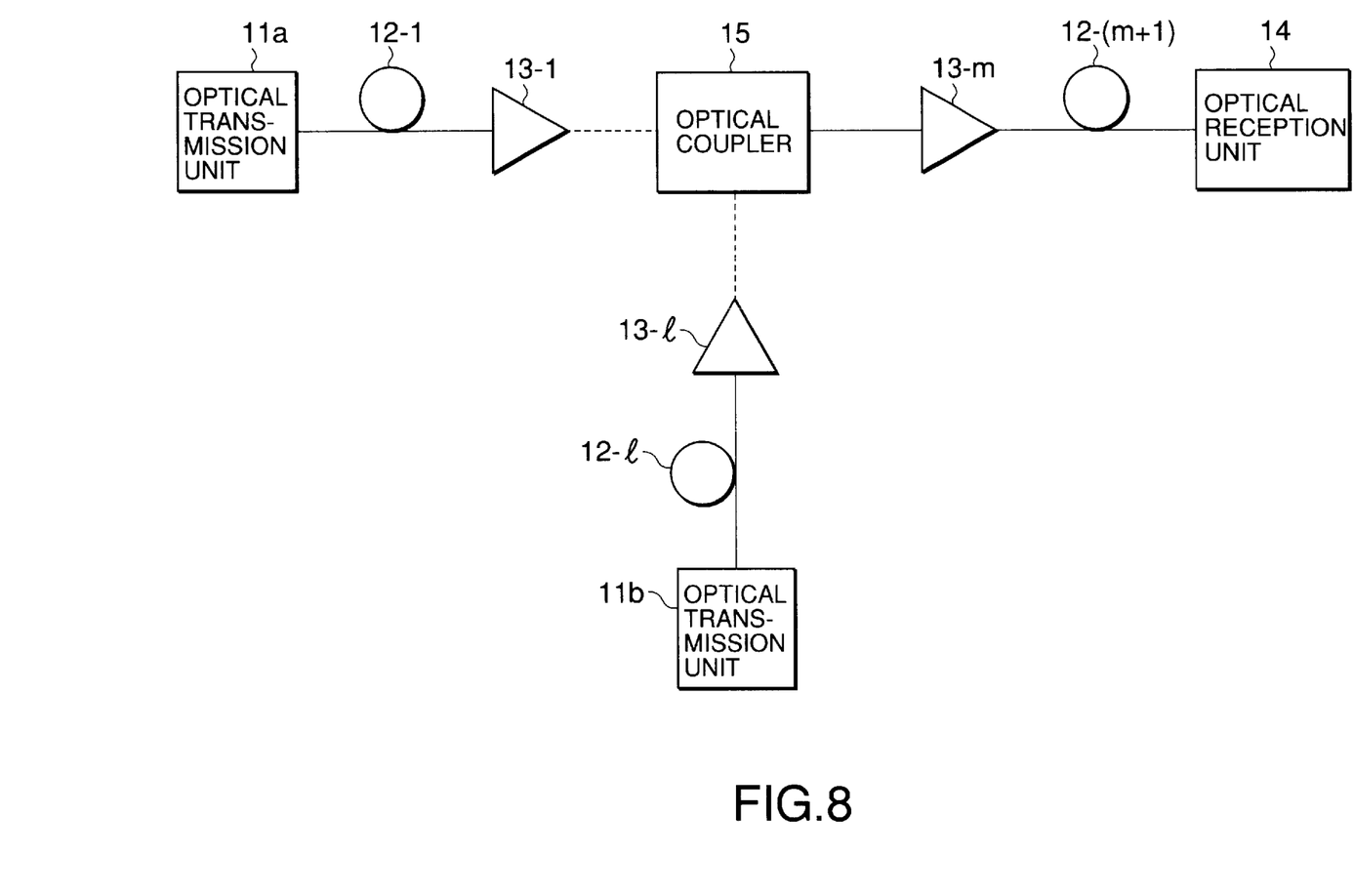
FIG. 8 is a block diagram showing another optical wavelength multiplexed transmission system.

FIG. 8 shows another example of the configuration of the optical wavelength multiplexed transmission system. The optical output from each of the optical transmission units 11$a$ and 11$b$ is coupled by an optical coupler 15, and transmitted to one optical reception unit 14. With the configuration, the effect obtained with the configuration shown in FIG. 4 can be obtained. As described above, the output level of the optical direct amplifier can be optimally controlled by detecting the number of multiplexed signals in the light output from the optical direct amplifier, and by controlling the output of the optical direct amplifier depending on the number of the detected signals even if the number of signals is reduced due to the occurrence of a fault, etc. or if the number of signals is increased on the transmitting side.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. An optical direct amplifier which amplifies wavelength multiplexed signal lights, comprising:
    a detector for detecting a number of modulated frequencies specific to each signal light of said wavelength multiplexed signal lights; and
    a control circuit for controlling output of said optical direct amplifier depending on the number of modulated frequencies detected by said detector.

2. The amplifier according to claim 1, wherein said detector comprises:
    an opto-electric converter for converting an optical wavelength multiplexed signal light to be output into an electric signal;
    a frequency detector for detecting a modulated frequency specific to each signal light from the electric signal converted by said opto-electric converter; and a counter for counting a number of modulated frequencies detected by said frequency detector.

3. The amplifier according to claim 1, wherein when the number of modulated frequencies detected by said detector changes, said control circuit controls an optical output level per signal light to be equal to an optical output level per signal light before the number of the modulated frequencies changes.

4. The amplifier according to claim 2, wherein said frequency detector comprises a frequency variable filter and a control circuit thereof.

5. The amplifier according to claim 1, further comprising an optical splitter for branching an optical wavelength multiplexed signal light and inputting a branched light to said detector.

6. The amplifier according to claim 1, further comprising: a rare-earth added fiber; and a light source for generating an excitation light to be input to said fiber.

7. The amplifier according to claim 1, wherein when the number of modulated frequencies detected by said detector decreases, said control circuit controls an optical output level per signal light to be equal to an optical output level per signal light before the number of the modulated frequencies decreases.

8. The amplifier according to claim 1, wherein when the number of modulated frequencies detected by said detector increases, said control circuit controls an optical output level per signal light to be equal to an optical output level per signal light before the number of the modulated frequencies increases.

9. A method of controlling an optical direct amplifier, comprising the steps of:
   counting a number of modulated frequencies specific to each wavelength multiplexed signal light; and
   controlling, when the counted number changes, an optical output level per signal light to be equal to an optical output level per signal light before the counted number changes.

10. The method according to claim 9, wherein:
    said counting step for counting the number of modulated frequencies comprises the steps of:
      converting output of an optical direct amplifier into an electric signal; and
      detecting a modulated frequency contained in the electric signal.

11. The method according to claim 10, wherein said modulated frequency is detected by sweeping said electric signal using a frequency variable filter.

12. An optical wavelength multiplexed transmission system, comprising:
    an optical transmission unit;
    an optical reception unit;
    an optical fiber transmission line provided between said optical transmission unit and said optical reception unit; and
    an optical direct amplifier provided between said optical fiber transmission lines, wherein said optical direct amplifier comprises:
      a detector for detecting a number of modulated frequencies specific to each signal light; and
      a control circuit for controlling output of said optical direct amplifier depending on the number of modulated frequencies detected by said detector,
      wherein said detector comprising a frequency detector for detecting said modulated frequencies specific to each signal light.

13. The optical wavelength multiplexed transmission system according to claim 13, wherein:
    said detector further comprising a counter for counting the number of modulated frequencies detected by the frequency detector.

14. The optical wavelength multiplexed transmission system according to claim 13, wherein:
    said frequency detector operates in synchronization with said counter.

* * * * *